United States Patent
Tamaru et al.

[15] 3,657,583
[45] Apr. 18, 1972

[54] MINIATURE SYNCHRONOUS MOTORS

[72] Inventors: Naokichi Tamaru; Shunsaku Nakauchi, both of Tokyo, Japan

[73] Assignee: Tohoku Oki Electric Company, Fukushima Japan

[22] Filed: Nov. 12, 1970

[21] Appl. No.: 88,892

[30] Foreign Application Priority Data

Mar. 18, 1970 Japan..............................45/22465

[52] U.S. Cl.......................310/162, 310/40 MM, 310/156
[51] Int. Cl..................................................H02k 21/00
[58] Field of Search.....................310/40, 40 MM, 42, 44, 72, 310/162, 163, 164, 165, 49, 269, 156, 179, 181; 74/22; 318/166, 171

[56] References Cited

UNITED STATES PATENTS

| | | |
|---|---|---|
| 3,333,128 | 7/1967 | Kobayashi..................310/40 MM |
| 3,148,319 | 9/1964 | Fredrickson..................318/696 |
| 1,708,334 | 4/1929 | Spencer.......................310/163 |
| 2,885,645 | 5/1959 | Wennerberg..................310/44 |
| 2,110,967 | 1/1935 | Andrews........................75/22 |
| 3,475,630 | 10/1969 | Heinzen........................310/164 |
| 2,103,356 | 12/1937 | Fisher..........................310/163 |
| 2,424,020 | 7/1947 | Chatelain.....................318/166 |
| 3,356,876 | 12/1967 | Scholten......................310/162 |

Primary Examiner—William M. Shoop, Jr.
Assistant Examiner—R. Skudy
Attorney—Chittick, Pfund, Birch, Samuels & Gauthier

[57] ABSTRACT

A miniature synchronous motor having a pot shaped core of high permeability magnetic material and having a central leg and an annular periphery, an energizing coil wound upon the central leg, a circular disc rotor rotatably journalled on the central leg, and an annular stator disposed on the annular periphery to closely surround the rotor.

5 Claims, 9 Drawing Figures

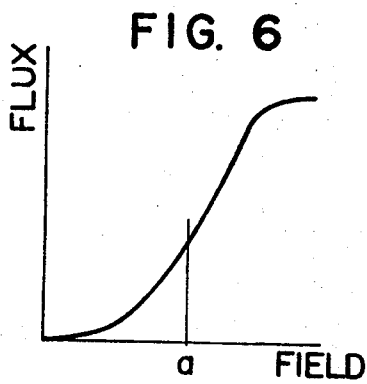
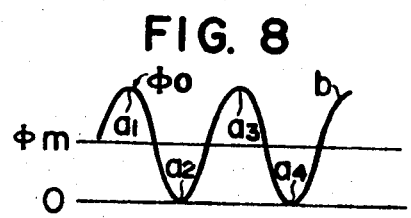
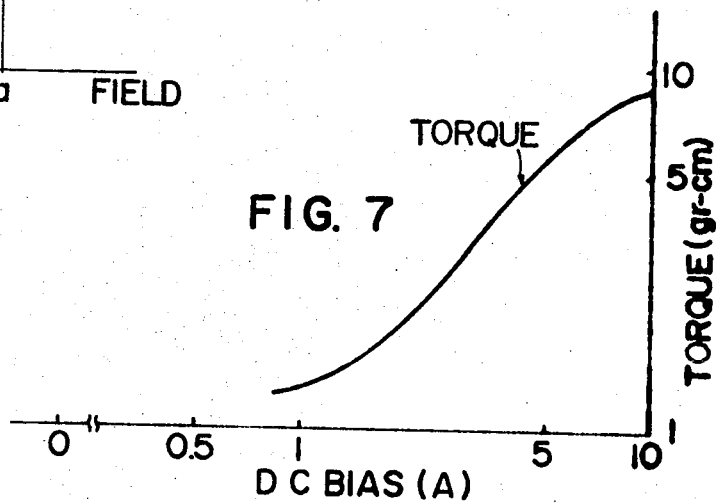
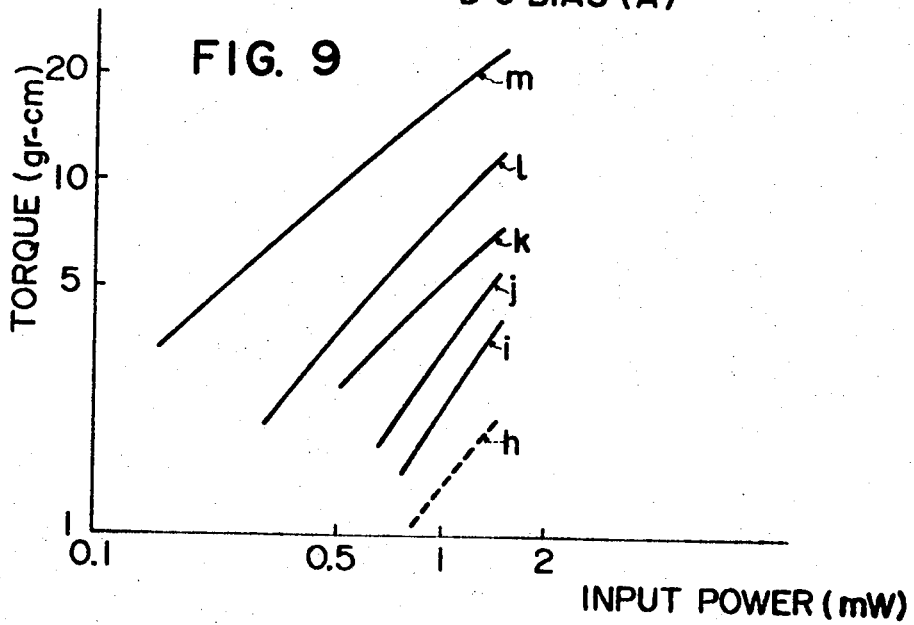

MINIATURE SYNCHRONOUS MOTORS

BACKGROUND OF THE INVENTION

This invention relates to improvements of a miniature synchronous motor and more particularly to a miniature phonic motor of low power and high efficiency.

Prior art phonic motors operate with input powers of from several to several tens watts. A Warren motor and a reluctance motor are also known as synchronous motors of small output but the efficiency of these prior motors is extremely low. Taking the Warren motor as an example, the output is only 15 milliwatts for an input of 3 watts, corresponding to an efficiency of only 0.5 percent. In the case of a reluctance motor, the output is 8 milliwatts for an input of 1 watt, which corresponds to an efficiency of 0.8 percent. Thus, there has been no miniature motor of an efficiency above 1 percent. Where these prior art motors are operated at no load they require a minimum input of about 1 watt. The reason that the efficiency of prior art minimature synchronous motors is extremely low is that with the construction of prior machines it is impossible to decrease the mechanical loss, iron loss and copper loss.

SUMMARY OF THE INVENTION

Accordingly it is an object of this invention to provide a novel miniature synchronous motor which can operate at high efficiency, say about 20 to 30 percent with small input.

A further object of this invention is to provide a novel miniature synchronous motor including an extremely light rotor, thus decreasing the mechanical loss. Such simplified rotor construction is based on the requirement that the rotor is not required to have large mechanical strength because miniature synchronous motors are not generally required to have large outputs.

Another object of this invention is to provide a novel synchronous motor wherein Mn-Zn ferrite is used to constitute the main magnetic circuit of the stator thus decreasing the iron loss, that is hysteresis loss and eddy current loss.

Yet another object of this invention is to provide a miniature synchronous motor of small copper loss by producing the required flux with a small magnetomotive force or small exciting current.

Another object of this invention is to provide a novel miniature synchronous motor wherein in order to decrease the copper loss the yoke comprising the main magnetic circuit of the motor is made of Mn-Zn ferrite having a high initial permeability so as to decrease magnetic resistance and wherein the stator and rotor are made of Permalloy having a high initial permeability and high maximum flux density and is easy to work.

Another object of this invention is to provide a novel miniature synchronous motor wherein the stator yoke is shaped in the form of a pot to decrease leakage flux and hence to decrease copper loss. This design is based on the fact that the leakage flux results in power consumption not contributing to the torque of the motor and constitutes one of the causes of the copper loss.

Yet another object of this invention is provide a novel miniature synchronous motor wherein unidirectional or DC flux generated by a permanent magnet is superposed upon AC flux which circulates through the stator and rotor of the motor whereby to generate the required torque with small flux.

Still another object of this invention is to provide a novel miniature synchronous motor wherein a capacitive impedance or a capacitor is included in the energizing circuit of the motor to cause the capacitor to resonate with the inductive impedance of the motor winding at the source frequency to eliminate the wattless component thus improving the efficiency of the motor.

BRIEF DESCRIPTION OF THE DRAWING

Further objects and advantages of the invention will become apparent and this invention will be better understood from the following description, reference being made to the accompaning drawings in which:

FIG. 6 shows a magnetization curve to explain the operation of the embodiment shown in FIG. 5;

FIG. 7 shows a characteristic curve to explain the manner of varying the generated torque by the application of a DC biasing field in accordance with this invention;

FIG. 8 is a plot to show the relation between AC field and DC biasing field in accordance with a modified embodiment of this invention; and FIG. 9 shows a set of torque curves to compare various embodiments of this invention with a prior art miniature synchronous motor.

DESCRIPTION OF THE PREFERRED EMBODIMENTS

Figure 1:
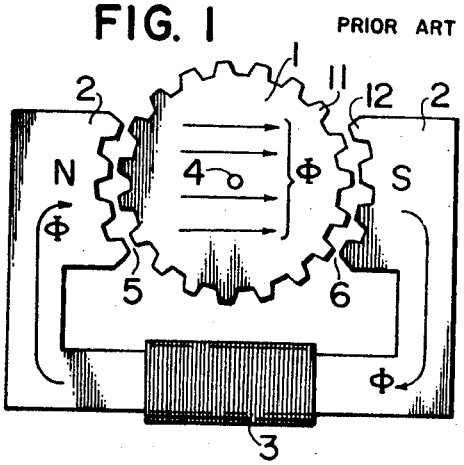
FIG. 1 is a diagrammation representation of a construction of a prior art miniature synchronous motor.

In a typical prior art phonic motor shown in FIG. 1, a rotor 1 and a stator 2 are provided with a plurality of teeth 11 and 12 on their cooperating surfaces which act as salient poles. Rotor 1 secured to shaft 4 is rotated by the magnetic pull created between teeth 11 and 12 when a coil 3 wound on the stator 2 is energized. In the prior phonic motor the flux Φ created by coil 3 passes through rotor 1 in the direction of its diameter and across two air gaps between the stator and rotor. This increases the reluctance and leakage flux to decrease the efficiency.

This invention contemplates a novel above described motor construction capable of improving the efficiency of the motor.

Figure 2:
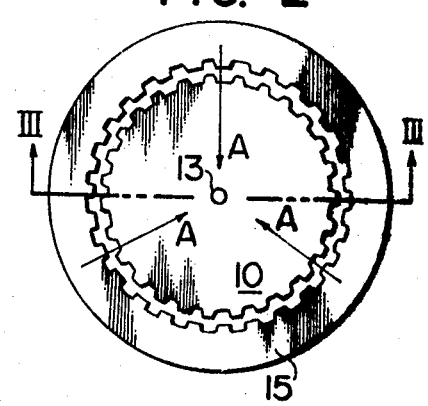
FIG. 2 is a plan view of one embodiment of the novel miniature synchronous motor.
Figure 3:
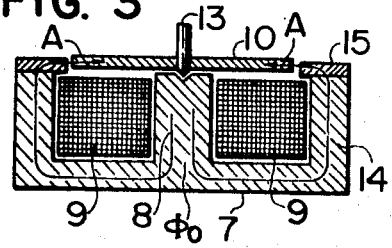
FIG. 3 shows a section of the motor shown in FIG. 2 taken along a line III—III.

As shown in FIGS. 2 and 3, according to this invention a pot shape core 7 of low loss Mn-Zn ferrite is utilized and an energizing coil 9 is wound upon the central leg 8 of the core. A rotor 10 is journalled by the upper end of central leg 8 by means of a shaft 13, and an annular stator 15 is mounted on the annular periphery 14 of the core 7. The annular stator 15 is made of a magnetic material such as Permalloy having a high initial permeability.

Upon energization of coil 9 with an alternating current the flux Φ created thereby flows from the lower end of the central leg 8 through annular periphery 14, stator 15 and rotor 10 back to the upper end of the central leg as indicated by arrows. With this construction, substantially all flux generated in the central leg flows between the rotor and stator in all radial directions through a uniform air gap. In other words, since the stator encircles the rotor around its entire periphery the leakage flux between them is reduced to substantially zero thus effectively utilizing the magnetomotive force created by energizing coil 9 as the torque of the motor. In other words, no ampere turn is required for the leakage flux, thus resulting in the decrease in the copper loss. Since the pot shaped core comprising the main magnetic circuit is made of ferrite having a low reluctance and high electric resistance, the iron loss such as the eddy current loss in this main magnetic circuit is small. Further, in accordance with this invention, rotor 10 is also made of a magnetic material having high initial permeability such as Permalloy like stator 15. This greatly reduces the reluctance of the magnetic circuit of the motor so that the ampere turn of the energizing coil required for producing the required flux an be decreased. Consequently it becomes possible to operate the motor with a small current thereby decreasing the copper loss.

Figure 4:
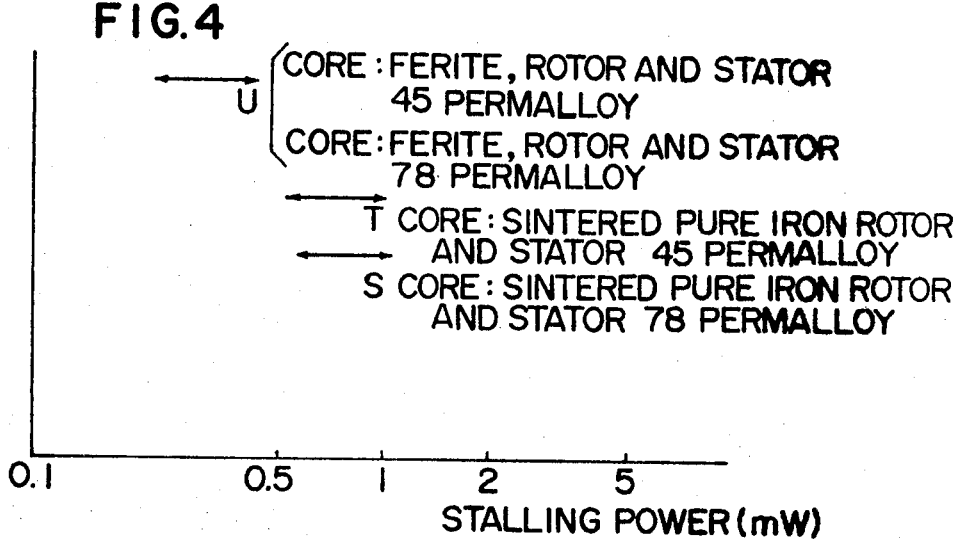
FIG. 4 shows a plot to explain the stalling power of the novel miniature synchronous machine.

FIG. 4 is a plot of measured values of the stalling power in milliwatts for equal load and for various materials utilized to fabricate the motor. Curve S represents the stalling power when the pot shaped core is made of sintered pure iron and the stator and rotor are made of 78 Permalloy, the mean value of the stalling power being 0.8mW. Curve T represents the stalling power when the core is made of similar sintered pure iron and the stator and rotor are made of 45 Permalloy, the mean value of the stalling power being 0.72mW. Curve U shows the stalling power when the core is made of ferrite (Mn-Zn) and the stator and rotor are made of 45 Permalloy or 78 Permalloy, the mean value of the stalling power in this case being 0.3mW. As can be noted from these curves the ratio of the stalling power of the motor utilizing sintered pure iron for the core and 78 Permalloy for the stator and rotor and that of the motor utilizing ferrite for the core and 45 or 78 Permalloy for the stator and stator is 3 : 8. This means that use of ferrite for the core greatly improves the efficiency of the motor. Motors utilized to obtain the data dipicted in FIG. 4 were phonic motors having an air gap of 0.1mm between the stator and rotor and a rotor diameter of 16mm. The mean values described above were the mean values of the stalling powers obtained on five phonic motors of the above described construction under the same load.

Figure 5:
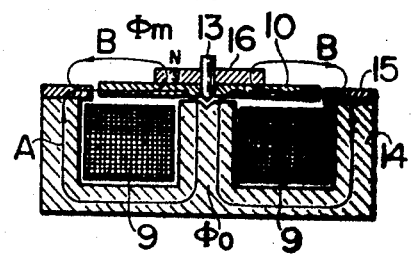
FIG. 5 is a sectional view of a modified embodiment of this invention.

FIG. 5 shows a modified embodiment of this invention especially designed to increase the torque. This modification is characterized by a disc shaped permanent magnet 16 coaxial with the rotor 10. Permanent magnet 16 is magnetized in the axial direction around its periphery so that it flux flows radially through the rotor and across the air gap as shown by an arrow B. In this manner a unidirectional flux $\Phi m$ produced by permanent magnet 16 is superposed upon an AC flux $\Phi$ produced by coil 9 in the magnetic circuit through the rotor and stator as indicated by arrows A and B in FIG. 5 to increase the torque of the motor. More particularly, as shown by a magnetization curve of FIG. 6, permanent magnet 16 establishes a DC bias at a point "$a$" to utilize rotor 10 at portions of high permeability. In other words, the magnetic circuit is utilized with reduced reluctance with the result that the magnetic flux is increased for the same magnetomotive force thus increasing the torque of the motor. Further, as the torque of the motor is proportional to $(\Phi+\Phi m)^2$, provision of magnet 16 increases torque by $2\Phi m \Phi$ in addition to $\Phi^2$.

FIG. 7 shows a characteristic curve to show the relationship between the DC bias and the torque wherein the abscissa represents the DC bias and the ordinate the torque in gram centimeters. As can be noted from the curve shown in FIG. 7 it is possible to select any desired value of torque by varying the DC bias. The characteristic curve shown in FIG. 7 is a plot of the results of test made on a motor whose core is made of ferrite and whose stator and rotor are made of 45 Permalloy, with in input of 1.5mW. Where the coil is energized by alternating current, suitable selection of the intensity of the magnet results in the same effect as if the frequency of the energizing current were reduced to one-half. More particularly, in FIG. 8 curve b represents the AC flux $\Phi$ produced by the AC energizing current. In the absence of magnet 16 rotor 10 will receive the driving force at respective crests $a_1, a_2, a_3$ and $a_4$. By selecting the amplitude of the DC bias $\Phi m$ to be equal to the amplitude of the half cycle of the AC flux $\Phi$ the rotor 16 will receive the driving force at alternate crests $a_1$ and $a_3$ which is equivalent to the reduction of the frequency of the exciting current to one-half. Since a motor circuit is generally inductive it is advantageous to connect a condenser having capacitance which resonates with the inductance of the motor circuit in series or parallel with the motor to decrease wattless component thus increasing the efficiency of the motor.

FIG. 9 shows a group of torque curves of above described various embodiments each embodied in a 40 pole phonic motor having a air gap of 0.06mm and operating at a frequency of 200Hz. The abscissa represents motor input in milliwatts and the ordinate torque in gram-cm. Curve $h$ shows a torque curve of a motor having a rotor made of pure iron, curve $i$ that of a motor having a rotor made of Mn-Zn ferrite, curve $j$ shows that of the motor represented by curve $i$ and connected in parallel with a condenser to establish parallel resonance, curve $k$ shows that of the motor represented by curve $i$ but incorporated with one barium ferrite biasing magnet of the size $10 \times 10 \times 8$mm, curve $l$ shows that of the same motor as curve $i$ but incorporated with two such biasing magnets, and curve $m$ that of the motor represented by curve $i$ but incorporated with a parallel resonance circuit. As can be clearly noted from these curves utilization of a pot shaped core greatly improves the efficiency of miniature synchronous motors. Incorporation of a series or parallel resonance circuit and or a biasing magnet further improves the efficiency of the motor.

What is claimed is :

1. A miniature synchronous motor comprising a pot shaped core of high permeability magnetic material, said core having a central leg and an annular periphery, an energizing coil wound upon said central leg, a magnetic rotor in the form of a complete circular disc with a plurality of peripheral poles thereon rotatably journalled on the axis of said central leg, and an annular magnetic stator disposed on said annular periphery to closely surround said rotor said stator being a complete circle and having a corresponding number of inner poles opposing said poles on said rotor.

2. The miniature synchronous motor according to claim 1 wherein said pot shaped core is made of ferrite.

3. The miniature synchronous motor according to claim 1 wherein said stator and rotor are made of Permalloy.

4. The miniature synchronous motor according to claim 1 which further comprises a permanent magnet disposed coaxially with said rotor to produce a unidirectional biasing flux superposed on the flux produced by said energizing coil in said rotor.

5. The miniature synchronous motor according to claim 4 wherein the magnitude of the unidirectional biasing flux of the permanent magnet is made substantially equal to the crest value of the AC flux produced by the energizing coil.

* * * * *

PO-1050
(5/69)

UNITED STATES PATENT OFFICE
CERTIFICATE OF CORRECTION

Patent No. 3,657,583        Dated April 18, 1972

Inventor(s) Naokichi Tamaru and Shunsaku Nakauchi

It is certified that error appears in the above-identified patent and that said Letters Patent are hereby corrected as shown below:

Column 1, line 70, "an" should be -- can --;

Column 3, line 39, "$\Phi+\Phi m)^2$" should be -- $\Phi_o \Phi m)^2$ --;
Column 3, line 40, "$2\Phi m\Phi$" should be -- $\Psi m \Phi_o$ --;
Column 3, line 40, "$\Phi^2$" should be -- $\Phi_o^2$ --

Column 4, line 22, "curve i" should be -- curve 1 --

Column 4, line 24, "curve i" should be -- curve 1 --.

Signed and sealed this 19th day of September 1972.

(SEAL)
Attest:

EDWARD M. FLETCHER, JR.        ROBERT GOTTSCHALK
Attesting Officer               Commissioner of Patents